Patented Nov. 15, 1938

2,136,399

UNITED STATES PATENT OFFICE 2,136,399

TREATMENT OF YEAST

Alfred S. Schultz, New York, and Charles N. Frey, Scarsdale, N. Y., assignors to Standard Brands Incorporated, New York, N. Y., a corporation of Delaware No Drawing. Application July 23, 1935, Serial No. 32,729. Renewed January 29, 1938

14 Claims. (Cl. 99—96)

The invention relates to a process for the treatment of yeast, and more particularly to a procedure whereby the keeping qualities and color of yeast are enhanced.

It is an object of the invention to provide a process in accordance with which the tendency of compressed yeast to crumble is materially reduced, or entirely prevented.

Another object of the invention is to provide a process whereby a compressed yeast of light color may be produced.

An additional object of the invention is to provide a procedure for the treatment of yeast which reduces crumbliness and improves the color of compressed yeast, and which may be readily, economically and effectively carried out on a manufacturing scale.

A still further object of the invention is to provide a compressed yeast having slight tendency to crumble and in connection with which the amount of cutting oil may be reduced.

A specific object of the invention is to provide a yeast having reduced tendency to crumble, and which has incorporated therewith a small amount of a phosphatide.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

In the practice of the invention a yeast having markedly reduced tendency to crumble may be produced by incorporating with yeast a small amount of a phosphatide. Incorporation of the phosphatide may be effected at various periods, for example, either before or during pressing, or the phosphatide may be introduced into the fermenter prior to, during, or following propagation of yeast. In this latter instance the phosphatide will be taken up by the yeast, and thus be present with the compressed yeast eventuating from the succeeding processing. In addition to reducing the tendency to crumble the addition of the phosphatide functions also to improve the color, thus giving a yeast product of lighter color. The improvement in color may also be effected by the utilization of an emulsifying agent, either per se, or in conjunction with the phosphatide through admixture thereof with the yeast.

The phosphatides desirably introduced are the lecithins and cephalins. These compounds will be referred to hereinafter and in the claims as a phosphatide or collectively as lecithin. The phosphatide may be added in varying quantities based upon the weight of the yeast, and satisfactory results from the standpoint of resistance to crumbling and improvement in color have been obtained when incorporating lecithin in an amount of from 0.02 to 0.5%, more especially to 0.25% and preferably 0.1%.

The emulsifying agents used are more especially fatty acid compounds, or derivatives of fatty acids, and specifically diglycol mono- and di-oleate, ammonium oleate, ammonium linoleate, glyceryl mono-stearate and diglycol mono- and di-stearate. These compounds occasion a lightening of the color of the yeast, and may be utilized in an amount of about 0.25%. It has been observed that the combination of lecithin with the emulsifying agents permits the use of a small amount of lecithin without detracting from the results obtained therewith. Particularly, the combination gives a yeast which is whiter in color and crumbles decidedly less readily than a yeast which does not contain these constituents.

As an illustrative embodiment of a manner in which the invention may be practiced, the following examples are given:

*Example 1*

Yeast which has been propagated and separated from wort in the usual manner may, during its preparation for pressing, have incorporated therewith a small amount of lecithin, for example, from 0.02% to 0.25%, preferably 0.1%. Following incorporation of the lecithin by thorough admixture the yeast may be pressed and otherwise prepared for the market by the ordinary procedure. The yeast thus obtained is of lighter color and may be allowed to stand for several days at room temperature without becoming crumbly.

*Example 2*

To the fermenter in which yeast is being propagated in a nutrient medium there may be added lecithin in an amount somewhat larger than that set forth in Example 1, and namely in the neighborhood of 0.5% based on the weight of the molasses. When the propagating period is ended, the yeast is separated, pressed, and otherwise handled in preparation for its placement on the market. This yeast contains a small amount of lecithin, and is characterized by being able to withstand room temperatures for several days without crumbling.

Example 3

Yeast which has been propagated, separated, and is being prepared for pressing may be incorporated with a small amount of lecithin, as 0.1% and with an emulsifying agent, as glyceryl mono-stearate in an amount of about 0.25%. Incorporation may be effected by suitable stirring or admixing, and thereafter the yeast is pressed, wrapped, and otherwise handled preparatory to marketing. Yeast so produced possesses little tendency to crumble, and is of decidedly lighter color.

Example 4

The procedure given in Example 3 may be followed with the exception that the quantity of lecithin is omitted. The yeast obtained possesses an improved color, but is not resistant to crumbling.

Yeasts which have been treated in the manners hereinbefore described are, in addition to being decidedly lighter in color, characterized by possessing excellent dispersing qualities, a smooth velvety texture, and an absence from crumbliness or a distinctive retardation thereof. Thus a yeast so treated, when permitted to stand for as long as three to four days at room temperature, does not become crumbly.

A further advantage arising from the use of a small amount of lecithin with yeast is that thereby the amount of oil required to be admixed with the yeast to enable ready division by the cutting machine may be reduced. While it is not definitely known, however, it is believed at the present that the effect of the lecithin is to lower the surface tension of the yeast, thereby making it less viscous, and decreasing the tendency to crumble.

The action of the lecithin is shown with the following test. Two samples of yeast containing 400 grams each were taken; to one of these samples which served as a check, 20 cc. of water were added, and to the other 10 cc. of water and 10 cc. of a 5% solution of pure lecithin. The color of the check was satisfactory for commercial purposes, but the color of that containing the lecithin was much lighter. Both mixes were put through a "spaghetti" machine and both showed well formed masses which did not check upon coming from the machine. However, the sample which did not contain lecithin broke up very readily when handled whereas the one containing lecithin could be handled readily without breaking. Further, the untreated sample became very crumbly upon exposure for three days at a temperature of 30° C., whereas the treated sample did not crumble.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention what we claim as new and desire to secure by Letters Patent is:

1. A process for the treatment of compressed yeast, which comprises incorporating lecithin with yeast whereby crumbliness is reduced and color is improved.

2. A process for the treatment of compressed yeast, which comprises incorporating lecithin with yeast in an amount of about 0.02 to 0.5% whereby crumbliness is reduced and color is improved.

3. A process for the treatment of compressed yeast, which comprises incorporating lecithin with yeast in an amount of about 0.1% whereby crumbliness is reduced and color is improved.

4. A process for the treatment of compressed yeast, which comprises incorporating a small amount of lecithin and of a fatty acid compound belonging to the group consisting of diglycol mono- and di-oleate, ammonium oleate, ammonium linoleate, glyceryl mono-stearate and diglycol mono- and di-stearate with yeast whereby crumbliness is reduced and color is improved.

5. A process for the treatment of compressed yeast, which comprises incorporating a small amount of lecithin and glyceryl mono-stearate with yeast whereby crumbliness is reduced and color is improved.

6. A process for the treatment of compressed yeast, which comprises incorporating a small amount of lecithin and glyceryl mono-stearate in an amount of about 0.25% with yeast whereby crumbliness is reduced and color is improved.

7. A process for the treatment of compressed yeast, which comprises incorporating a small amount of an emulsifying agent belonging to the group consisting of diglycol mono- and di-oleate, ammonium oleate, ammonium linoleate, glyceryl mono-stearate and diglycol mono- and di-stearate with yeast whereby color is improved.

8. A process for the treatment of compressed yeast, which comprises incorporating a small amount of glyceryl mono-stearate with yeast whereby color is improved.

9. A process for the treatment of compressed yeast, which comprises incorporating glyceryl mono-stearate in an amount of about 0.25% with yeast whereby color is improved.

10. As a composition of matter a compressed yeast having incorporated therewith a small amount of lecithin.

11. As a composition of matter a compressed yeast having lecithin incorporated therewith in an amount of from 0.02 to 0.5%.

12. As a composition of matter a compressed yeast having incorporated therewith a small amount of an emulsifying agent belonging to the group consisting of diglycol mono- and di-oleate, ammonium oleate, ammonium linoleate, glyceryl mono-stearate and diglycol mono- and di-stearate and being of an improved light color.

13. As a composition of matter a compressed yeast having incorporated therewith a small amount of glyceryl mono-stearate and being of an improved light color.

14. As a composition of matter a compressed yeast having glyceryl mono-stearate incorporated therewith in an amount of about 0.25%, and being of an improved light color.

ALFRED S. SCHULTZ.
CHARLES N. FREY.